(12) United States Patent
Xu et al.

(10) Patent No.: US 8,295,382 B2
(45) Date of Patent: Oct. 23, 2012

(54) ANTENNA MULTIPLEXING SYSTEM AND METHOD OF SMART ANTENNA AND MULTIPLE-INPUT MULTIPLE-OUTPUT ANTENNA

(75) Inventors: Xiaodong Xu, Beijing (CN); Guangyi Liu, Beijing (CN); Guanghui Cheng, Beijing (CN); Yuhong Huang, Beijing (CN); Zhigang Yan, Beijing (CN); Chunfeng Cui, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 337 days.

(21) Appl. No.: 12/452,036

(22) PCT Filed: Jun. 26, 2008

(86) PCT No.: PCT/CN2008/001231
§ 371 (c)(1),
(2), (4) Date: Dec. 23, 2009

(87) PCT Pub. No.: WO2009/003363
PCT Pub. Date: Jan. 8, 2009

(65) Prior Publication Data
US 2010/0135420 A1    Jun. 3, 2010

(30) Foreign Application Priority Data

Jun. 29, 2007    (CN) .......................... 2007 1 0118155

(51) Int. Cl.
*H04B 7/02* (2006.01)
(52) U.S. Cl. ....................................................... 375/267
(58) Field of Classification Search .................. 375/130, 375/267, 295, 316; 455/575.7; 370/312
See application file for complete search history.

(56) References Cited

U.S. PATENT DOCUMENTS 6,147,648 A * 11/2000 Granholm et al. ..... 343/700 MS
(Continued)

FOREIGN PATENT DOCUMENTS

CN          1878023 A       12/2006
(Continued)

OTHER PUBLICATIONS

Aug. 14, 2008 International Search Report issued in PCT/CN2008/001231 (with translation).

*Primary Examiner* — Sam K Ahn
*Assistant Examiner* — Shawkat M Ali
(74) *Attorney, Agent, or Firm* — Oliff & Berridge, PLC (57) ABSTRACT

An antenna multiplexing system and a method of a smart antenna and a Multiple-Input Multiple-Output antenna are provided, wherein the system includes a MIMO antenna array and a smart antenna array, the smart antenna array includes several groups of antenna array elements in which the distance between neighbor antenna array elements is less than or equal to one half of wavelength, and the smart antenna array comprises at least two groups of antenna array elements with the coherence sufficient for the requirement of the MIMO applications. The method includes: in accordance with the type of the data to be transmitted, determining a transmitting mode and processing the data to be transmitted accordingly, and in accordance with the transmitting mode, controlling the MIMO antenna array or smart antenna array, so as to transmitting the data to the mobile terminal. With the premise that the actual coverage of TD-SCDMA system should be further improved, the requirement of higher user throughout could be met, and the MIMO antenna system could satisfy the requirement of the future system evolution. Both of the applications of the MIMO and the smart antenna could be met with the use of the same antenna feeding system, and the adaptive switching of the MIMO and the smart antenna with respect to the user could be achieved.

18 Claims, 7 Drawing Sheets

U.S. PATENT DOCUMENTS

| | | | |
|---|---|---|---|
| 6,571,369 B1* | 5/2003 | Li | 714/792 |
| 2004/0095907 A1* | 5/2004 | Agee et al. | 370/334 |
| 2005/0266902 A1* | 12/2005 | Khatri et al. | 455/575.7 |
| 2006/0050771 A1* | 3/2006 | Shinozaki | 375/144 |
| 2007/0037519 A1* | 2/2007 | Kim et al. | 455/63.4 |
| 2007/0049218 A1* | 3/2007 | Gorokhov et al. | 455/102 |
| 2007/0147414 A1* | 6/2007 | Niu et al. | 370/465 |
| 2008/0107196 A1* | 5/2008 | Won | 375/260 |
| 2008/0181160 A1* | 7/2008 | Dillon | 370/312 |

FOREIGN PATENT DOCUMENTS

| | | |
|---|---|---|
| CN | 101034926 A | 9/2007 |
| WO | WO 2004/008657 A1 | 1/2004 |

\* cited by examiner

ANTENNA MULTIPLEXING SYSTEM AND METHOD OF SMART ANTENNA AND MULTIPLE-INPUT MULTIPLE-OUTPUT ANTENNA

FIELD OF THE INVENTION

The present invention relates to a multiple antenna system and method, particularly to an antenna multiplexing system and method of a smart antenna and a Multiple-Input Multiple-Output antenna.

BACKGROUND OF THE INVENTION

The current multiple antenna technique mainly includes two forms: a smart antenna system, and a Multiple-Input Multiple-Output (MIMO) antenna system. In the MIMO antenna system, multiple antennas are used to suppress channel fading or to improve channel capacity, which may provide spatial multiplexing gain and spatial diversity gain for the system, wherein spatial multiplexing technology may greatly improve the channel capacity and spatial diversity may increase reliability of a channel and decrease bit error rate of the channel. The MIMO antenna system mainly achieves diversity gain dependent upon independence of spatial channel fading characteristics on different antenna pairs. Therefore, larger antenna element spacing is needed in the MIMO antenna system.

The smart antenna system mainly performs signal processing dependent upon high dependence between array elements to achieve beam forming. Therefore, smaller antenna element spacing is needed in the smart antenna system, which is set to ½ wavelength while applied currently in a Time Division-Synchronous Code Division Multiple Access (TD-SCDMA) system in a third generation mobile communication system. For example, in the TD-SCDMA system, all elements of a smart antenna array (assume a number of the elements is N, where N is a positive integer) employ the same vertical polarization. Each antenna element spacing is ½ wavelength. The N antenna elements act together on beams from respective directions to perform spatial filter. Narrow beams with high gain is point to the direction of a served user, and null is pointed to the direction of interference, which increase output signal-to-jamming ratio of the array and reduce the interference inside the system while improving the anti-interference capability and the coverage capability of the system. However, since a common channel and a broadcast channel (or a MBMS service) do not have a downlink beam forming gain, there is a significant difference between the coverage capability of the common channel and the broadcast channel (or the MBMS service) and that of a channel for a general service, so that the actual coverage range of the network or the MBMS service is smaller than that of a service channel, which results in that advantages of the performance of the smart antenna may not be presented sufficiently. Although interference of the common channel in a multi-frequency cellular network may be reduced to some extent by the multi-frequency networking technique, the actual network indicates that the coverage capability of the common channel is still weaker than that of the service channel.

SUMMARY OF THE INVENTION

An object of an embodiment of the present invention is to provide an antenna multiplexing system and method of a smart antenna and a Multiple-Input Multiple-Output antenna, which, by the organic combination of the smart antenna and the Multiple-Input Multiple-Output antenna, achieves common presence and common use of the smart antenna and the MIMO antenna in a system. The unbalance between the coverage capability of the common channel and that of the service channel in the TD-SCDMA system is rectified by the MIMO technique and the requirement of higher throughput in a evolution system in the future may be met. The requirement of application of the MIMO antenna and the smart antenna may be met by the same antenna-feeder system, and adaptive switching for a user between the MIMO antenna and the smart antenna may be achieved.

To achieve the above object, an embodiment of the present invention provides an antenna multiplexing system of a smart antenna and a Multiple-Input Multiple-Output antenna, including an MIMO antenna array and a smart antenna array, the smart antenna array includes a number of antenna elements, spacing of adjacent antenna elements being smaller than or equal to ½ wavelength, and the MIMO antenna array consists of at least two antenna elements with dependence satisfying requirements of MIMO application.

The antenna multiplexing system of the smart antenna and the Multiple-Input Multiple-Output antenna further includes a transmitting processing device configured for controlling the MIMO antenna array and the smart antenna array to transmit a data to a mobile terminal.

The transmitting processing device includes:

a determining module configured for determining a transmitting mode according to a type of a data to be transmitted, correspondingly processing the data to be transmitted under the transmitting mode, and controlling transmission of the data;

an MIMO antenna array transmitting processing module configured for transmitting a control information data or an MBMS service data to all mobile terminals in a cell through the MIMO antenna array according to the transmitting mode, to meet the requirement of balance of coverage capability of a TD-SCDMA system; and a smart antenna array transmitting processing module configured for transmitting a general service data to a single target mobile terminal in the cell through the smart antenna array according to the transmitting mode, to reduce interference between users and enhance the coverage capability.

The determining module includes:

a transmitting mode determining unit configured for determining the transmitting mode according to the type of the data to be transmitted;

a data channel code, scrambling code and intermediate code assigning unit configured for selecting and assigning a corresponding channel code, scrambling code and intermediate code to the data to be transmitted of different types according to the transmitting mode;

a data spread spectrum processing unit configured for performing spread spectrum processing on the data to be transmitted according to the channel code and scrambling code;

a multiplexing unit configured for multiplexing the data to be transmitted after spread spectrum processing and the corresponding intermediate code to constitute a burst;

an ON/OFF controller provided on a transmitting path of the multiplexing unit; and a transmitting mode control unit configured for transmitting the burst through the MIMO antenna array transmitting processing module or the smart antenna array transmitting processing module by controlling the ON/OFF controller according to the transmitting mode determined by the transmitting mode determining unit.

The transmitting mode respectively is to transmit a data to all mobile terminals in the cell by the MIMO antenna array and to transmit a data to a single target mobile terminal in the cell by the smart antenna array.

On the basis of the technical solution of the antenna multiplexing system, the MIMO antenna array and the smart antenna array constitute an antenna array with N antenna elements, wherein N is an integer, M antenna elements in the antenna array with dependence satisfying the requirement of MIMO application constituting the MIMO antenna array, wherein M is an integer no smaller than 2, and the remaining N-M antenna elements with spacing smaller than or equal to ½ wavelength constituting the smart antenna array.

On the basis of the technical solution of the antenna multiplexing system, the MIMO antenna array and the smart antenna array may both be vertically polarized antenna arrays. It is also possible that the MIMO antenna array is a dual-polarized antenna, and the smart antenna array is a vertically polarized antenna.

Preferably, the antenna array with N antenna elements is a linear antenna array, and the N-M antenna elements constitute a directional smart antenna array.

Preferably, the M antenna elements constituting the MIMO antenna array are located at an end portion of the linear antenna array.

Preferably, the antenna array with N antenna elements is a combined antenna array, and the N-M antenna elements constitute a directional smart antenna array in a linear layout or an omnidirectional smart antenna array in a circular layout.

On the basis of the technical solution of the antenna multiplexing system, the MIMO antenna array and the smart antenna array constitute an antenna array with N antenna elements, wherein N is an integer, M antenna elements in the antenna array with dependence satisfying the requirement of MIMO application constituting the MIMO antenna array, wherein M is an integer no smaller than 2, and all the N antenna elements with spacing of adjacent antenna elements smaller than or equal to ½ wavelength constituting the smart antenna array.

On the basis of the technical solution of the antenna multiplexing system, the MIMO antenna array and the smart antenna array may both be vertically polarized antenna arrays. It is also possible that the MIMO antenna array is a dual-polarized antenna, and the smart antenna array is a vertically polarized antenna.

Preferably, the antenna array with N antenna elements is a linear antenna array, and all the N antenna elements constitute a directional smart antenna array.

Preferably, the M antenna elements constituting the MIMO antenna array are located at an end portion of the linear antenna array.

Preferably, the antenna array with N antenna elements is a circular antenna array, and all the N antenna elements constitute an omnidirectional smart antenna array.

To achieve the above object, an embodiment of the present invention provides an antenna multiplexing method of a smart antenna and a Multiple-Input Multiple-Output antenna, including:

determining a transmitting mode according to a type of a data to be transmitted and correspondingly processing the data to be transmitted under the transmitting mode; and controlling the MIMO antenna array to transmit a control information or an MBMS service data to all mobile terminals in a cell according to the transmitting mode, or controlling the smart antenna array to transmit a general service data to a single target mobile terminal in the cell according to the transmitting mode, the smart antenna array include a number of antenna elements, spacing of adjacent antenna elements being smaller than or equal to ½ wavelength, and the MIMO antenna array consists of at least two antenna elements with dependence satisfying requirement of MIMO application.

The determining the transmitting mode according to the type of the data to be transmitted and correspondingly processing the data to be transmitted under the transmitting mode including:

determining the transmitting mode according to the type of the data to be transmitted;

selecting and assigning a corresponding channel code, scrambling code and intermediate code to the data to be transmitted of different types according to the transmitting mode;

performing spread spectrum processing on the data to be transmitted according to the determined channel code and scrambling code; and multiplexing the data to be transmitted after spread spectrum processing and the corresponding intermediate code to constitute a burst.

The transmitting mode respectively is to transmit a data to all mobile terminals in the cell by the MIMO antenna array and to transmit a data to a single target mobile terminal in the cell by the smart antenna array.

On the basis of the technical solution of the antenna multiplexing system, the MIMO antenna array and the smart antenna array may both be vertically polarized antenna arrays. It is also possible that the MIMO antenna array is a dual-polarized antenna, and the smart antenna array is a vertically polarized antenna.

An embodiment of the present invention proposes an antenna multiplexing system in which a smart antenna and an MIMO antenna are organically combined. Antenna elements of a smart antenna array used in the TD-SCDMA system are divided into two groups, each respectively using for different purposes, one of which constitutes an MIMO antenna array and the other of which constitutes a smart antenna array. In an area with rich-scatter such as a city, two or more antenna elements with larger antenna element spacing, which have smaller dependence, may constitute an MIMO antenna array while a number of antenna elements with antenna element spacing smaller than or equal to $\lambda/2$ are still used as a smart antenna array to perform beam forming together, thereby forming an antenna multiplexing system of a smart antenna and an MIMO antenna. The smart antenna array may enhance the coverage capability of the service channel, and in the case of the equal total-power, the MIMO system may significantly increase the throughput of a user or decrease the bit error rate. Therefore, if the common channel is realized by the MIMO system, the coverage of the common channel may be further enhanced. By the embodiments of the invention, in the premise that the actual coverage capability of the TD-SCDMA system is further increased, the requirement of higher throughput of a user may also be satisfied. Particularly, the MIMO antenna system in the present invention may further satisfy the requirement of the evolution system in the future, such as an LTE and WiMax system. The requirement of application of the MIMO antenna and the smart antenna may be met by the same antenna-feeder system, and adaptive switching for a user between the MIMO antenna and the smart antenna may be achieved.

Further, an embodiment of the present invention also proposes an antenna multiplexing system including dual-polarized antenna elements. Since an existing antenna array may suffer from factors such as size, scale and distance of antenna elements and antenna element spacing, spacing of two antenna elements of a MIMO antenna array may not meet the requirement of dependence of MIMO application. In the embodiment of the present invention, the antenna elements constituting the MIMO antenna array are configured to be polarized in different manner to constitute the dual-polarized MIMO antenna array in the embodiment of the present invention. By using the feature of spatial fading characteristics of the mutually orthogonal antenna elements being independent, the requirement of dependence of an MIMO application is met, which expands application field and use environment of the embodiments of the present invention.

The technical solution of the embodiments of the present invention will be further described in detail with reference to the drawings and embodiments below.

DESCRIPTION OF THE REFERENCE SIGNS

| | |
|---|---|
| 10: MIMO antenna array; | 20: smart antenna array; |
| 30: transmitting processing device; | 40: mobile terminal; |
| 31: MIMO antenna transmitting processing module; | 32: smart antenna array transmitting processing module; |
| 33: determining module; | 331: transmitting mode determining unit; |
| 332: data channel code, scrambling code and intermediate code assigning unit; | 333: data spread spectrum processing unit; |
| 334: multiplexing unit; | 335: transmitting mode control unit; |
| 336: ON/OFF controller. | |

DETAILED DESCRIPTION OF THE EMBODIMENTS

An antenna multiplexing system of a smart antenna and a Multiple-Input Multiple-Output antenna in an embodiment of the present invention includes an MIMO antenna array and a smart antenna array. The smart antenna array includes a number of antenna elements, spacing of adjacent antenna elements being smaller than or equal to $\lambda/2$, wherein $\lambda$ is a wavelength. The MIMO antenna array consists of at least two antenna elements with dependence satisfying requirements of MIMO application. In an embodiment of the present invention, to transmit a data to a target mobile terminal by combining the MIMO antenna array and the smart antenna array into one antenna multiplexing system, the MIMO antenna array is used to transmit a control information data or an MBMS service data to all mobile terminals in a cell to meet the requirement of balance of coverage capability of the TD-SCDMA system, and the smart antenna array is used to transmit a general service data to a single mobile terminal in the cell to reduce interference between users and enhance the coverage capability.

Figure 1:
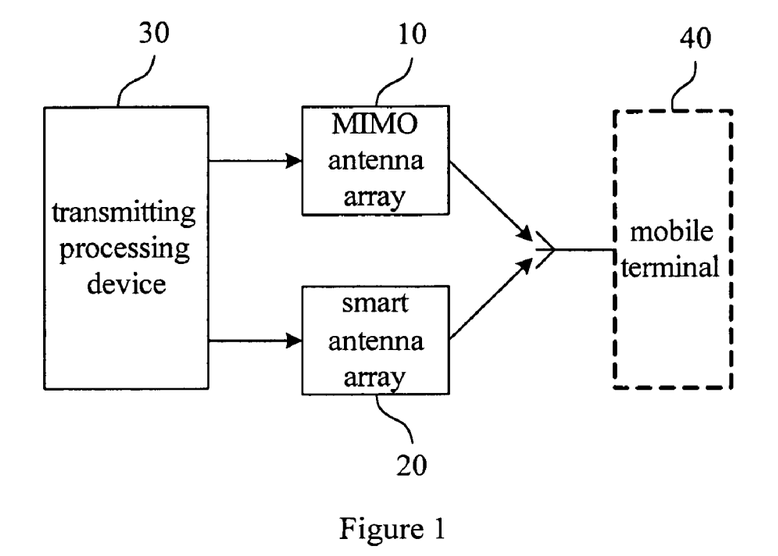
FIG. 1 is a schematic diagram of a structure of an antenna multiplexing system of a smart antenna and a Multiple-Input Multiple-Output antenna in an embodiment of the present invention.

FIG. 1 is a schematic diagram of an implementing structure of an antenna multiplexing system of a smart antenna and a Multiple-Input Multiple-Output antenna in an embodiment of the present invention. As show in FIG. 1, the antenna multiplexing system of the smart antenna and the Multiple-Input Multiple-Output antenna includes an MIMO antenna array 10, a smart antenna array 20 and a transmitting processing device 30. The transmitting processing device 30 is configured for controlling the MIMO antenna array 10 and the smart antenna array 20 to transmit a data to a mobile terminal 40. In the present implementing structure, the MIMO antenna array 10 consists of at least two antenna elements with dependence satisfying requirements of MIMO application, and the smart antenna array 20 includes a number of antenna elements, spacing of adjacent antenna elements being smaller than or equal to $\lambda/2$, wherein $\lambda$ is a wavelength.

Figure 2:
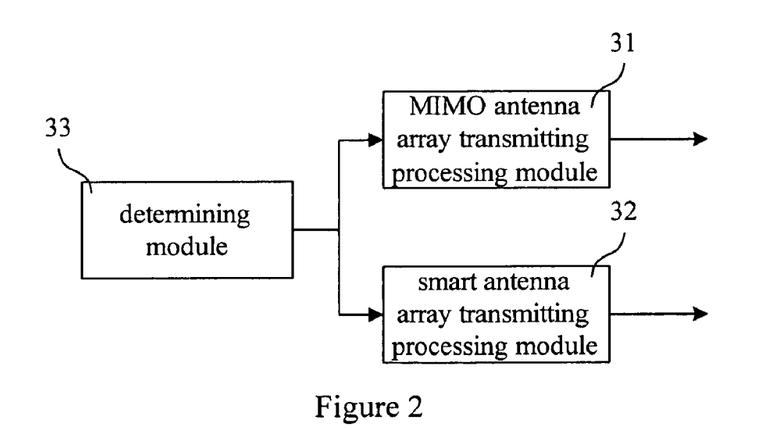
FIG. 2 is a schematic diagram of a structure of a transmitting processing device in an embodiment of the present invention.

FIG. 2 is a schematic diagram of a structure of a transmitting processing device in an embodiment of the present invention. As shown in FIG. 2, the transmitting processing device 30 includes an MIMO antenna array transmitting processing module 31, a smart antenna array transmitting processing module 32 and a determining module 33. The determining module 33 is configured for determining a transmitting mode according to a type of a data to be transmitted, deciding assignment of a channel code, a spread spectrum code and an intermediate code in different modes, and controlling transmission of the data. The MIMO antenna array transmitting processing module 31 is configured to transmit a control information data or an MBMS service data to all mobile terminals in a cell through the MIMO antenna array 10 according to the transmitting mode determined by the determining module 33, to meet the requirement of balance of coverage capability of the TD-SCDMA system. The smart antenna array transmitting processing module 32 is configured to transmit a general service data to a single mobile terminal in the cell through the smart antenna array 20 according to the transmitting mode determined by the determining module 33, to reduce interference between users and enhance the coverage capability.

Figure 3:
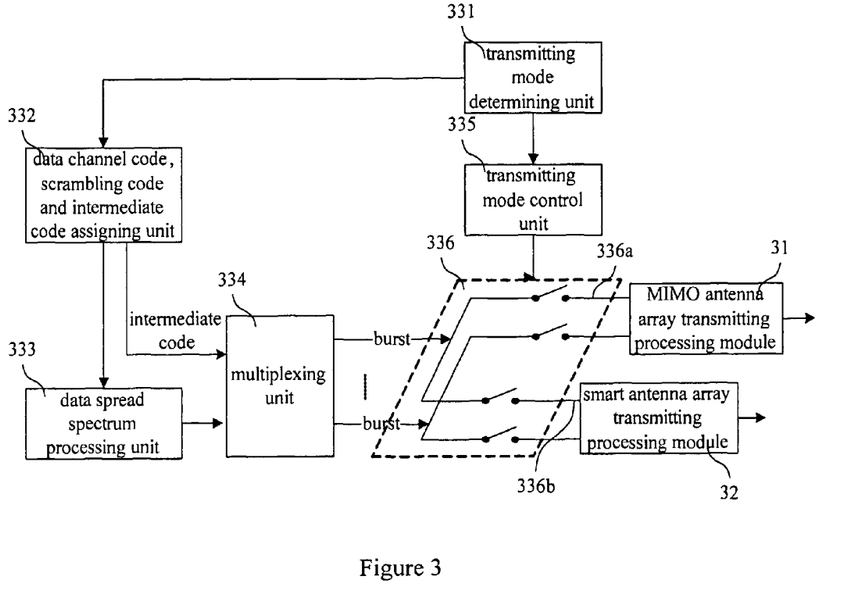
FIG. 3 is a schematic diagram of a structure of a determining module in an embodiment of the present invention.

FIG. 3 is a schematic diagram of a structure of a determining module in an embodiment of the present invention. As shown in FIG. 3, the determining module 33 includes a transmitting mode determining unit 331, a data channel code, scrambling code and intermediate code assigning unit 332, a data spread spectrum processing unit 333, a multiplexing unit 334, a transmitting mode control unit 335 and an ON/OFF controller 336. The transmitting mode determining unit 331 is configured to determine a transmitting mode according to a type of a data to be transmitted and transmit the transmitting mode to the data channel code, scrambling code and intermediate code assigning unit 332 and the transmitting mode control unit 335. After receiving the transmitting mode, the data channel code, scrambling code and intermediate code assigning unit 332 selects and assigns a corresponding channel code, scrambling code and intermediate code to the data to be transmitted of different types according to the transmitting mode, and transmits the selected information to the data spread spectrum processing unit 333. After receiving the selected information, the data spread spectrum processing unit 333 performs a spread spectrum processing on the data to be transmitted by using the selected channel code and scrambling code, and then transmits the data to be transmitted to the multiplexing unit 334. The multiplexing (TDM) unit 334 multiplexes the data to be transmitted after spread spectrum processing and the corresponding intermediate code (Midamble) to constitute a burst. The transmitting mode control unit 335 and the ON/OFF controller 336 are configured to transmit the burst outward through a corresponding transmitting processing module. The ON/OFF controller 336 is connected to a transmitting path from the multiplexing unit 334 to the MIMO antenna array transmitting processing module 31 and the smart antenna array transmitting processing module 32 and is controlled by the transmitting mode control unit 335. After receiving the transmitting mode from the transmitting mode determining unit 331, the transmitting mode control unit 335 is able to transmit the burst through the MIMO antenna array transmitting processing module 31 or the smart antenna array transmitting processing module 32 by determining the ON/OFF of the controller 336 according to the transmitting mode. The ON/OFF controller 336 may be an ON/OFF switch or another switching device.

When the transmitting mode determined by the transmitting mode determining unit 331 according to the type of the data to be transmitted is to transmit a data to all mobile terminals in the cell by the MIMO antenna array, a MIMO antenna ON/OFF switch 336a in the controller 336 is turned on and a smart antenna ON/OFF switch 336b is turned off by the transmitting mode control unit 335, so that the data can be transmitted outward through the MIMO antenna array transmitting processing module 31. The data to be transmitted by the MIMO antenna array is a control information data or an MBMS service data. When the transmitting mode determined by the transmitting mode determining unit 331 according to the type of the data to be transmitted is to transmit a data to a single target mobile terminal in the cell by the smart antenna array, the MIMO antenna ON/OFF switch 336a in the controller 336 is turned off and the smart antenna ON/OFF switch 336b is turned on by the transmitting mode control unit 335, so that the data can be transmitted outward through the smart antenna array transmitting processing module 32. The data to be transmitted by the smart antenna array is a general service data.

An embodiment of the present invention proposes an antenna multiplexing system in which a smart antenna and an MIMO antenna are organically combined. Antenna elements of a smart antenna array used in the TD-SCDMA system are divided into to two groups, each respectively using for different purposes, one of which constitutes an MIMO antenna array and the other of which constitutes a smart antenna array. In an area with rich-scatter such as a city, two or more antenna elements with larger antenna element spacing, which have smaller dependence, may constitute an MIMO antenna array while a number of antenna elements with antenna element spacing smaller than or equal to $\lambda/2$ are still used as a smart antenna array to perform beam forming together, thereby forming an antenna multiplexing system of a smart antenna and an MIMO antenna. The smart antenna array may enhance the coverage capability of the service channel, and in the case of the equal total-power, the MIMO system may significantly increase the throughput of a user or decrease the bit error rate. Therefore, if the common channel is realized by the MIMO system, the coverage of the common channel may be further enhanced. By the embodiments of the invention, in the premise that the actual coverage capability of the TD-SCDMA system is further increased, the requirement of higher throughput of a user may also be satisfied. Particularly, the MIMO antenna system may further satisfy the requirement of the evolution system in the future, such as an LTE and WiMax system. In addition, it can be seen from the first embodiment to be described hereinafter, the system in the embodiments of the present invention may be achieved through certain improvement by sufficiently using the basic architecture of the antenna array of the existing TD-SCDMA system, without rebuilding the antenna-feeder system on a large scale.

Base on the above described implementing solution, the MIMO antenna array and the smart antenna array in the embodiments of the present invention may be implemented in a variety of implementing structures.

First Embodiment

Figure 4:
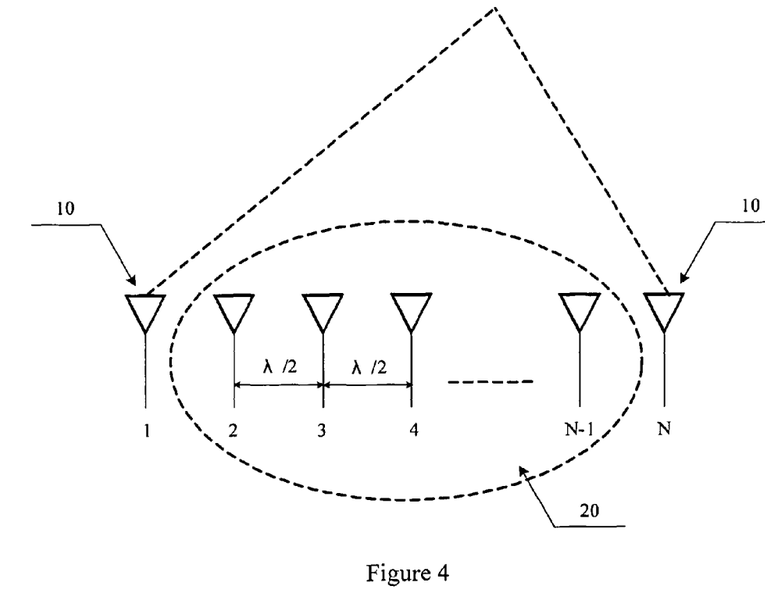
FIGS. 4 and 5 are schematic diagrams of structures of a first embodiment of the present invention.
Figure 5:
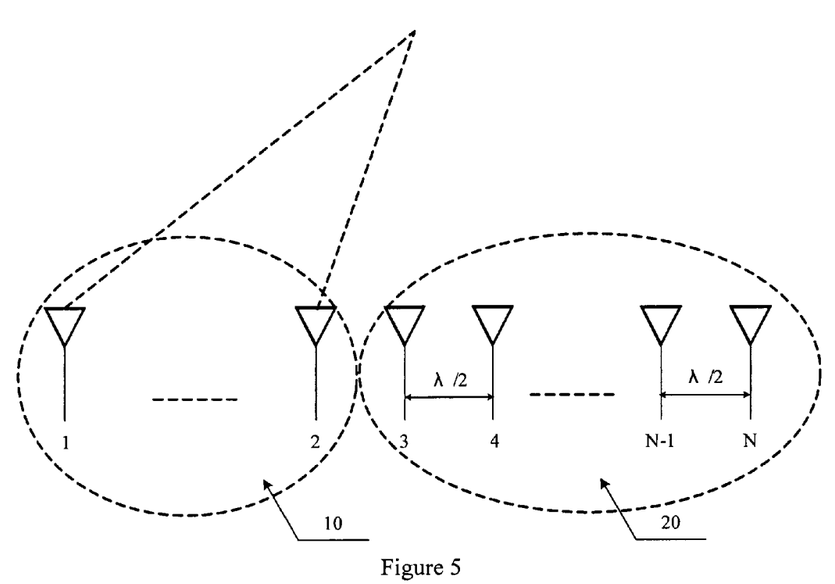

FIGS. 4 and 5 are schematic diagrams of structures of the first embodiment of the embodiments of the present invention. As shown in FIG. 4, the first embodiment is an improvement on the basis of the smart antenna array used in the TD-SCDMA system. The number of the antenna elements is N. The antenna elements are divided into two groups, one of which consists of two antenna elements located at two end portions and is served as a MIMO antenna array 10, and the other of which consists of N−2 antenna elements in the middle and is served as a directional smart antenna array, wherein N is an integer. The MIMO antenna array 10 and the smart antenna array 20 both are vertically polarized antenna arrays.

Since spacing of the antenna elements of the smart antenna array used in the TD-SCDMA system is smaller than or equal to $\lambda/2$, all N antenna elements satisfy the requirement of the smart antenna and may be used to perform beam forming. On the other hand, two antenna elements located at the far ends with the spacing of (N−1) $\lambda/2$, which have smaller dependence in an area with rich-scatter such as a city, may constitute the MIMO antenna array. For example, when an antenna with 8 antenna elements is used in the TD-SCDMA system, the spacing between two antenna elements of the MIMO antenna array is 3.5$\lambda$. It is indicated from an investigation that the spacing satisfies the requirement of dependence of the MIMO application in some environment. The requirement in the embodiment of the present invention may be satisfied by modifying the power amplifying of the two antenna elements.

As shown in FIG. 5, when the spacing between two antenna elements in the MIMO antenna array 10 satisfies the requirement of dependence of the MIMO application, the two antenna elements may also be arranged at the same end of the antenna array. The MIMO antenna array 10 and the smart antenna array 20 both are vertically polarized antenna arrays.

Second Embodiment

Figure 6:
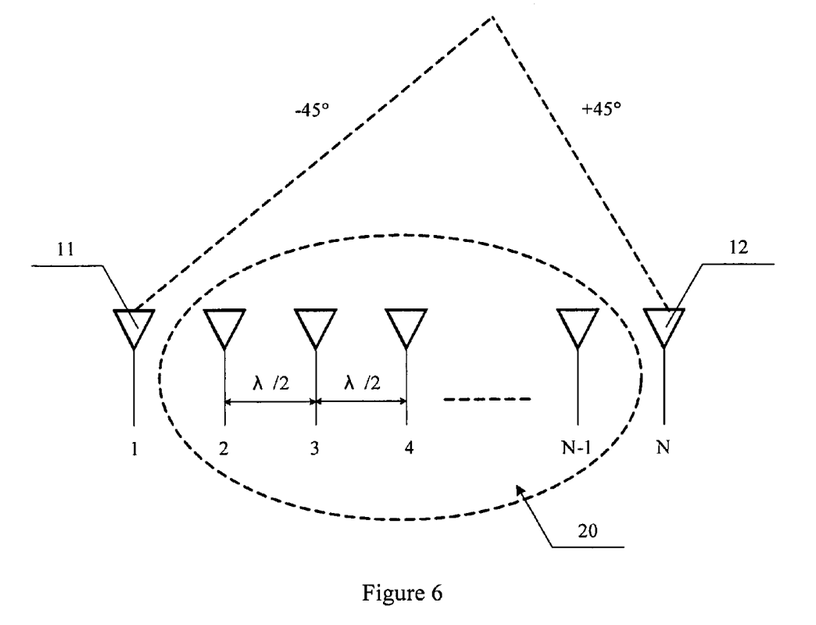
FIGS. 6 and 7 are schematic diagrams of structures of a second embodiment of the present invention.
Figure 7:
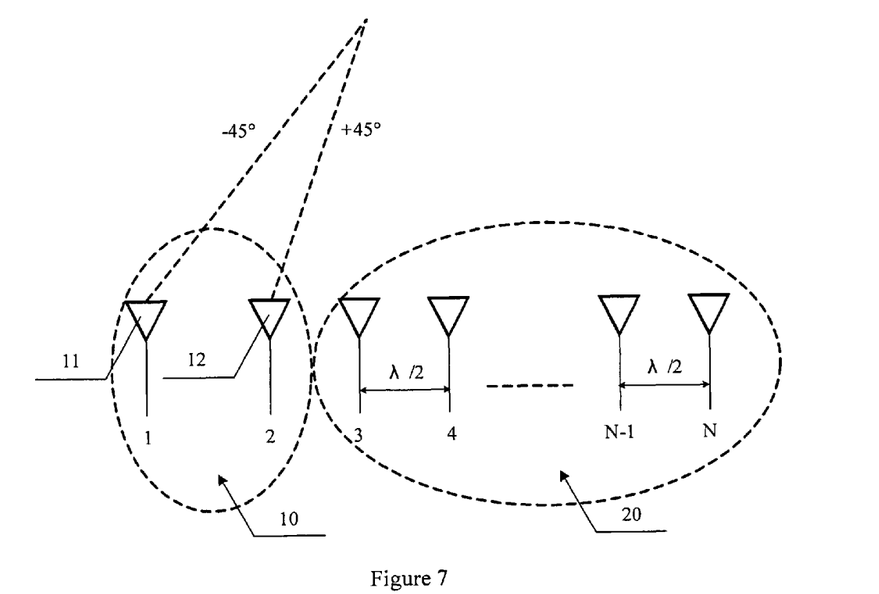

FIGS. 6 and 7 are schematic diagrams of structures of the second embodiment of the embodiments of the present invention, which are an improvement of the structure of the first embodiment. Two antenna elements of the MIMO antenna array 10 in FIG. 6 are located at two end portions, and two antenna elements of the MIMO antenna array 10 in FIG. 7 both are located at the same end portion. As shown in FIGS. 6 and 7, the MIMO antenna array 10 of the second embodiment consists of an antenna element 11 and an antenna element 12 located at the far end(s), and the smart antenna array 20 consists of the remaining N−2 antenna elements. The antenna element 11 and the antenna element 12, which are orthogonally polarized, are dual-polarized antennas. The smart antenna array 20 is vertically polarized antenna array.

In the smart antenna array used in the existing TD-SCDMA system, due to the influence of factors such as size, scale and distance of antenna elements and antenna element spacing, two antenna elements of the MIMO antenna array sometimes may not meet the requirement of dependence of MIMO application. Accordingly, the second embodiment proposes an antenna multiplexing system of dual-polarized antenna elements, in which the antenna element 11 and the antenna element 12 constituting the MIMO antenna array are configured to be polarized in different manner. By using the mutually independent spatial fading characteristics of the two mutually orthogonal antenna elements, that is, the antenna element 11 and the antenna element 12, the MIMO antenna array in the present embodiment may be constituted, and the requirement of dependence of an MIMO application may be satisfied. For example, the antenna element 11 which may be polarized by −45°, and the antenna element 12 which may be polarized by +45°, constitute dual-polarized antenna elements, so that the spatial fading characteristics of the two antenna elements are mutually independent, and thus the condition of MIMO application may be satisfied. All antenna elements of the smart antenna array 20 employ vertically polarize manner.

Third Embodiment

Figure 8:
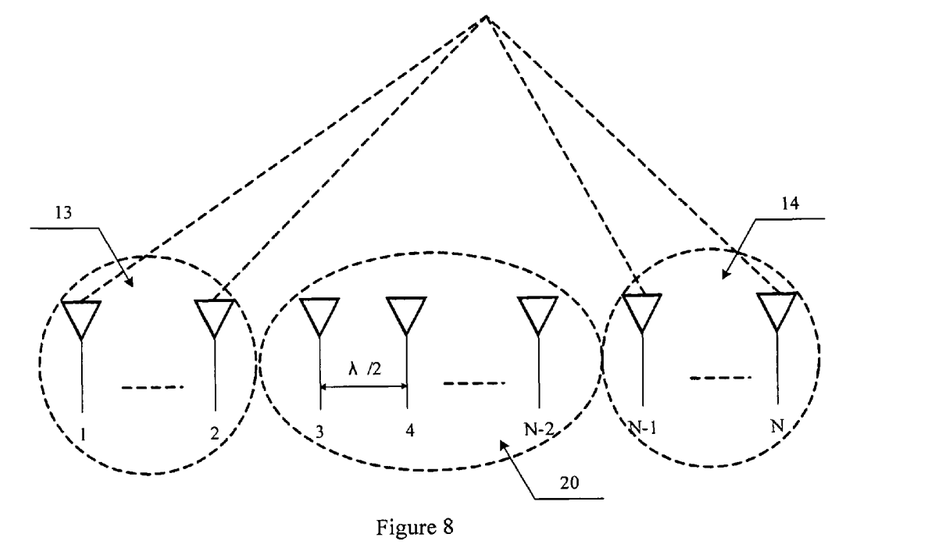
FIG. 8 is a schematic diagram of a structure of a third embodiment of the present invention.

FIG. 8 is a schematic diagram of a structure of the third embodiment of the embodiments of the present invention. As shown in FIG. 8, the third embodiment is still based on the smart antenna array used in the TD-SCDMA system. The number of the antenna elements, that is, N, is kept constant. A first antenna element group 13 at one far end and a second antenna element group 14 at the other far end constitute the MIMO antenna array. N−4 antenna elements in the middle constitute the directional smart antenna array 20. The spacing of two antenna elements in the first antenna element group 13 and the second antenna element group 14 should satisfy the requirement of dependence of the MIMO application, and the spacing of the N−4 antenna elements in the middle should be smaller than or equal to λ/2 to satisfy the requirement of application of the smart antenna. The antenna elements in the first antenna element group 13, the second antenna element group 14 and the smart antenna array 20 all are vertically polarized antennas. Further, the first antenna element group 13 in the third embodiment may consist of three or more antenna elements, and the second antenna element group 14 may also consist of three or more antenna elements.

Fourth Embodiment

Figure 9:
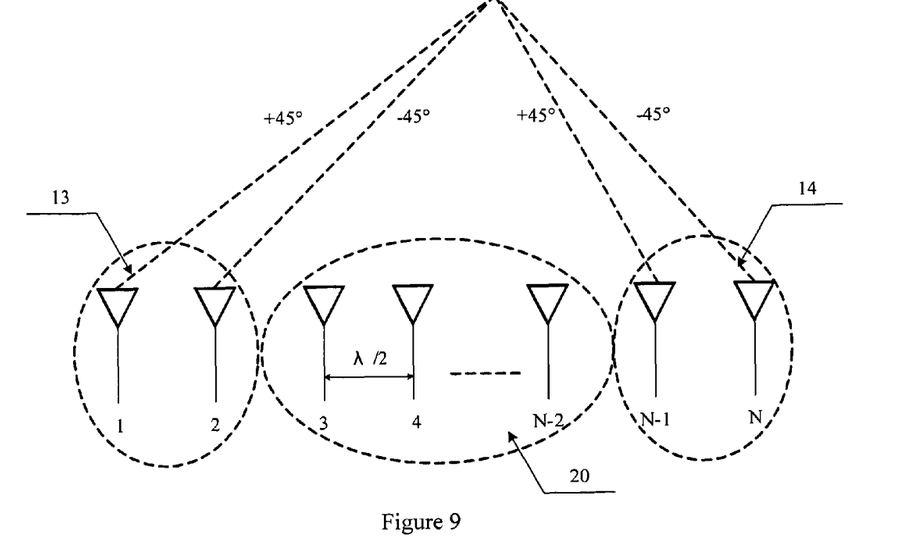
FIG. 9 is a schematic diagram of a structure of a fourth embodiment of the present invention.

FIG. 9 is a schematic diagram of a structure of the fourth embodiment of the embodiments of the present invention, which is an improvement of the structure of the third embodiment. As shown in FIG. 9, the MIMO antenna array of the fourth embodiment includes a first antenna element group 13 and a second antenna element group 14 respectively located at two far ends. Each antenna element group includes two antenna elements. The two antenna elements, which are orthogonally polarized, are dual-polarized antennas. The smart antenna array 20 consists of N−4 antenna elements in the middle, which are vertically polarized antennas.

Due to the influence of factors such as size and scale of an antenna element group and antenna element group spacing, two antenna elements of the MIMO antenna array sometimes may not meet the requirement of dependence of MIMO application. Accordingly, the fourth embodiment divides the antenna elements constituting the MIMO antenna array into several pairs and ensures that spacing of the antenna element pairs satisfies the requirement of the MIMO application. Each pair of the antenna elements are configured to be polarized in different manner. By using the mutually independent spatial fading characteristics of the two mutually orthogonal antenna elements, it is ensured that not only the condition of the MIMO application is satisfied, but also the size of the antenna array is reduced. For example, the two antenna elements in the first antenna element group 13 or the second antenna element group 14 are respectively polarized by +45° and by −45°, and constitute dual-polarized antennas.

Fifth Embodiment

Figure 10:
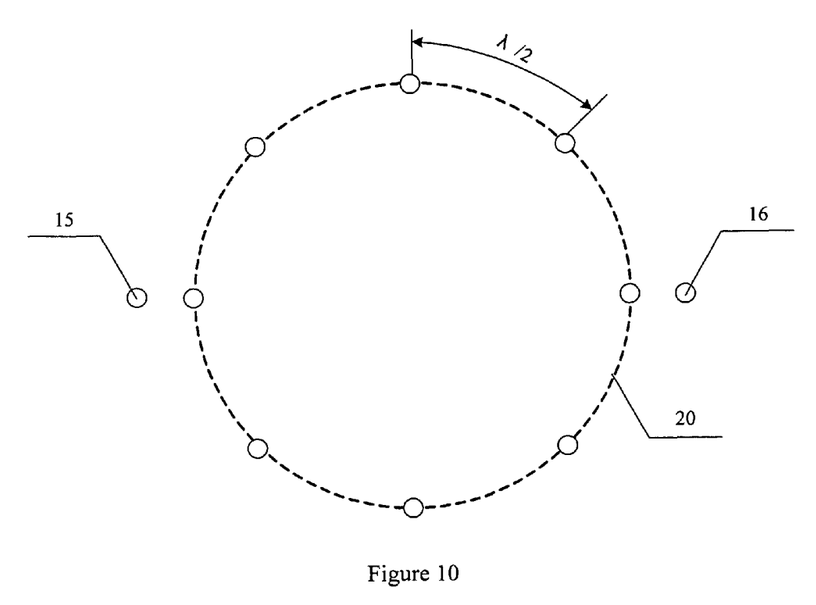
FIG. 10 is a schematic diagram of a structure of a fifth embodiment of the present invention.

FIG. 10 is a schematic diagram of a structure of the fifth embodiment of the embodiments of the present invention. As shown in FIG. 10, the fifth embodiment is a combined antenna array structure. The number of antenna elements is N. The MIMO antenna array consists of an antenna element 15 and an antenna element 16. The remaining N−2 antenna elements with spacing of λ/2 constitute a circular omnidirectional smart antenna array 20. The MIMO antenna array and the smart antenna array 20 both are vertically polarized antenna arrays.

In the fifth embodiment, by making the spacing between the antenna element 15 and the antenna element 16 satisfy the condition of the MIMO application, that is, making the antenna spacing large enough, the MIMO antenna array may be constituted. The other N−2 antenna elements satisfy the requirement of the smart antenna and may be used to perform beam forming.

Base on the technical solution of the fifth embodiment, when the spacing between the antenna element 15 and the antenna element 16 is small, which does not satisfy the condition of the MIMO application, the antenna element 15 and the antenna element 16 may be configured to be dual-polarized antennas. By using the feature of their mutually independent spatial fading, the MIMO antenna array of the fifth embodiment is constituted and the requirement of dependence of the MIMO application is satisfied. The smart antenna array 20 is vertically polarized.

Also, the smart antenna array 20 of the fifth embodiment may also be directional smart antenna array configured in a linear layout. Further, the MIMO antenna array 10 and the smart antenna array 20 both may be vertically polarized antenna arrays, or the MIMO antenna array 10 is a dual-polarized antenna array, and the smart antenna array 20 is a vertically polarized antenna array, which will not described in detail here.

Sixth Embodiment

Figure 11:
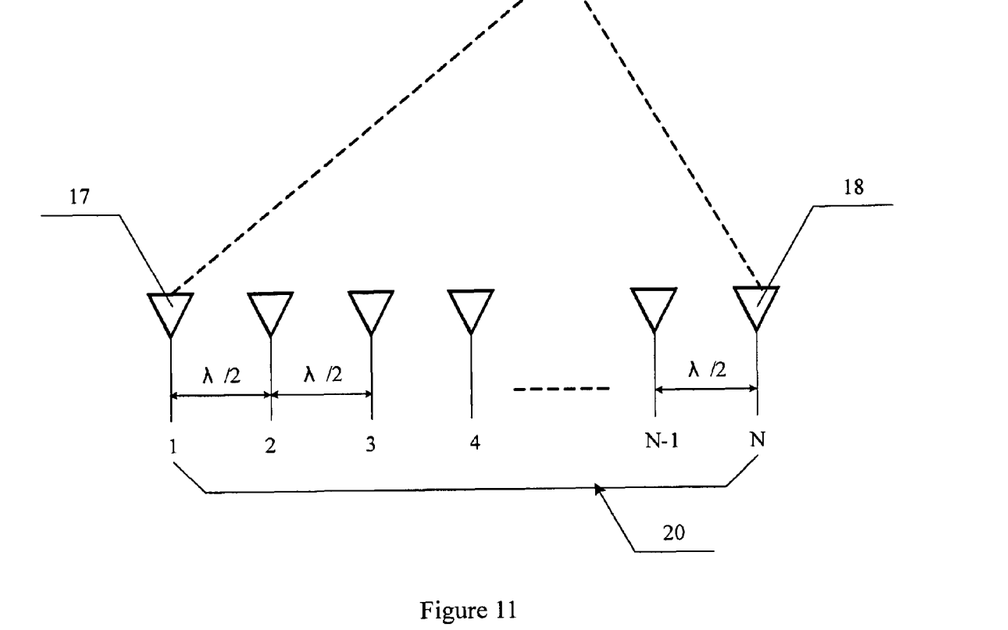
FIG. 11 is a schematic diagram of a structure of a sixth embodiment of the present invention.

FIG. 11 is a schematic diagram of a structure of the sixth embodiment of the embodiments of the present invention. As shown in FIG. 11, the sixth embodiment is an improvement on the basis of a linear antenna array used in the TD-SCDMA system. The number of antenna elements is N. The antenna elements are divided into two groups, one of which consists of two antenna elements, that is, an antenna element 17 and an antenna element 18, located at two end portions with dependence satisfying the requirement of the MIMO application and served as an MIMO antenna array 10, and the other of which consists of all N antenna elements with spacing of adjacent antennas smaller than or equal to ½ wavelength and is served as a directional smart antenna array.

Seventh Embodiment

Figure 12:
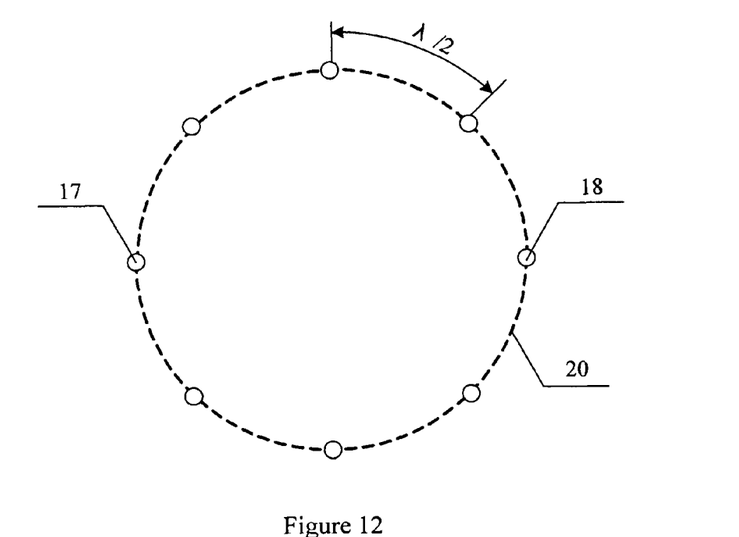
FIG. 12 is a schematic diagram of a structure of a seventh embodiment of the present invention.

FIG. 12 is a schematic diagram of a structure of the seventh embodiment of the embodiments of the present invention. As shown in FIG. 12, the seventh embodiment is an improvement on the basis of a circular antenna array used in the TD-SCDMA system. The number of antenna elements is N. The antenna elements are divided into two groups, one of which consist of two antenna elements, that is, an antenna element 17 and an antenna element 18, with dependence satisfying the requirement of the MIMO application and served as an MIMO antenna array, and the other of which consists of all N antenna elements with spacing of adjacent antennas smaller than or equal to ½ wavelength and is served as a omnidirectional smart antenna array.

The sixth and seventh embodiments may be used to implement an MIMO antenna system only by appropriately modifying the power amplifying of a part of antenna elements, on the basis of sufficient use of antenna structure of the TD-SCDMA system, so that the improvement of the system may be achieved on the basis of the protection of the existing invest to the largest extent.

It can be seen from the above described embodiments that, the power amplifying of the original antenna system may be kept or be appropriately modified according the requirement of actual application. The antenna multiplexing system is used under different conditions. In the embodiments of the present invention, the MIMO antenna array and the smart antenna array may be used to transmit data of different types, so as to satisfy the requirement of balance of the coverage capability of the TD-SCDMA system. The appropriate modification to the power amplifying of the original antenna system may increase the power of the MIMO antenna array, so that the total power thereof is equivalent to that of the original antenna system. Further, on the basis of the above described embodiments, the technical solutions illustrated in the first to the fifth embodiments may be combined to form a new technical solution, which will not described in detail here.

Figure 13:
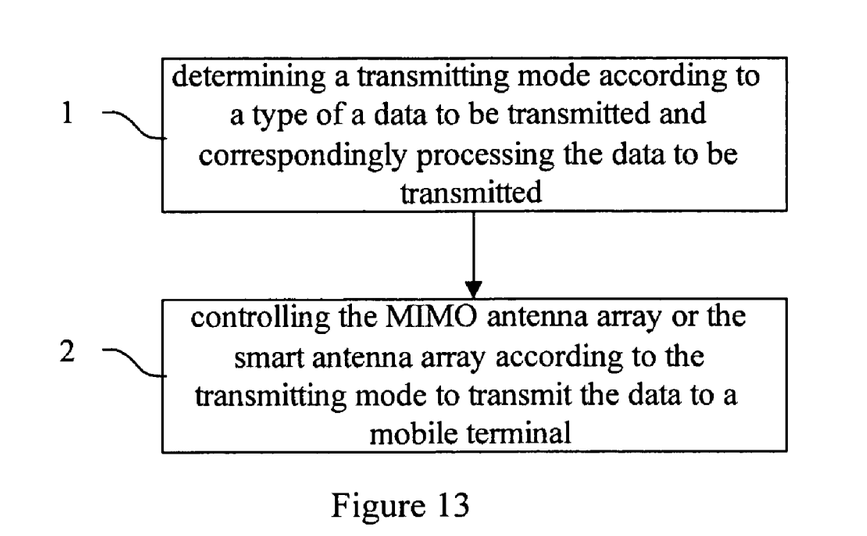
FIG. 13 is a flowchart of an antenna multiplexing method of a smart antenna and a Multiple-Input Multiple-Output antenna in an embodiment of the present invention.

FIG. 13 is a flowchart of an antenna multiplexing method of a smart antenna and a Multiple-Input Multiple-Output antenna in an embodiment of the present invention.

In operation 1, a transmitting mode is determined according to a type of a data to be transmitted and the data to be transmitted is correspondingly processed.

In operation 2, an MIMO antenna array or a smart antenna array is controlled to transmit the data to a mobile terminal according to the transmitting mode.

The smart antenna array includes a number of antenna elements, and spacing of adjacent antenna elements is smaller than or equal to ½ wavelength. The MIMO antenna array consists of at least two antenna elements with dependence satisfying requirement of MIMO application.

Figure 14:
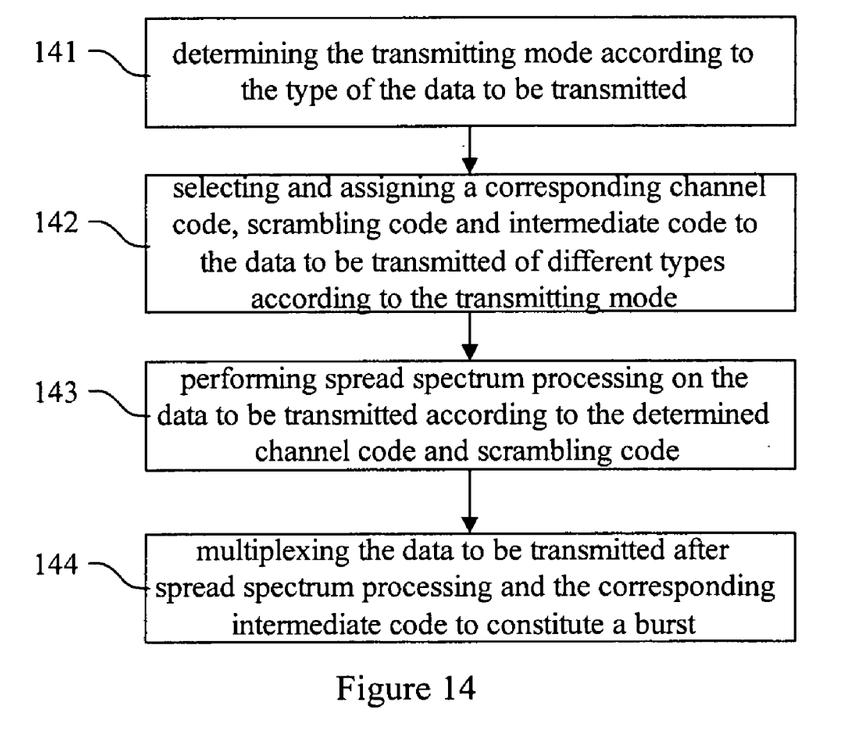
FIG. 14 is a flowchart of determining a transmitting mode and processing a data to be transmitted in an embodiment of the present invention.

FIG. 14 is a flowchart of determining a transmitting mode and processing a data to be transmitted in an embodiment of the present invention. In the above solution, the operation 1 includes:

Operation 141, the transmitting mode is determined according to the type of the data to be transmitted;

Operation 142, a corresponding channel code, scrambling code and intermediate code are selected and assigned to the data to be transmitted of different types according to the transmitting mode;

Operation 143, spread spectrum processing is performed on the data to be transmitted according to the determined channel code and scrambling code; and Operation 144, the data to be transmitted after spread spectrum processing and the corresponding intermediate code are multiplexed to constitute a burst.

An embodiment of the present invention proposes an antenna multiplexing method in which a smart antenna and an MIMO antenna are organically combined. Antenna elements of a smart antenna array used in the TD-SCDMA system are divided into two groups, each respectively using for different purposes, one of which constitutes an MIMO antenna array and the other of which constitutes a smart antenna array. In an area with rich-scatter such as a city, two or more antenna elements with larger antenna element spacing, which have smaller dependence, may constitute an MIMO antenna array while a number of antenna elements with antenna element spacing smaller than or equal to λ/2 are still used as a smart antenna array to perform beam forming together, thereby forming an antenna multiplexing system of a smart antenna and an MIMO antenna. The smart antenna array may enhance the coverage capability of the service channel, and in the case of the equal total-power, the MIMO system may significantly increase the throughput of a user or decrease the bit error rate. Therefore, if the common channel is realized by the MIMO system, the coverage of the common channel may be further enhanced. By the embodiments of the invention, in the premise that the actual coverage capability of the TD-SCDMA system is further increased, the requirement of higher throughput of a user may also be satisfied. Particularly, the MIMO antenna system may further satisfy the requirement of the evolution system in the future, such as an LTE and WiMax system.

In an embodiment of the present invention, in the operation 141, determining the transmitting mode is to determine the transmitting mode according to the type of the data to be transmitted, so that the MIMO antenna array or the smart antenna array transmits the data to corresponding users at different time, respectively. For example, when in the operation 141 the type of the data is a control information data, the data is transmitted at a first time slot through the MIMO antenna array, to improve coverage of the common channel. For example, when in the operation 141 the type of the data is a general service data, the data is transmitted through the smart antenna system, to enhance the coverage capability of the system.

In an embodiment of the present invention, the operation 142 may be implemented by a corresponding data channel code, scrambling code and intermediate code assigning unit. The operation 143 may be implemented by a corresponding data spread spectrum processing unit. The operation 144 may be implemented by a corresponding multiplexing (TDM) unit. A corresponding channel code, scrambling code and intermediate code are selected and assigned to the data to be transmitted according to the transmitting mode, and the selected information is transmitted to the data spread spectrum processing unit. After receiving the selected information, the data spread spectrum processing unit performs spread spectrum processing on the data to be transmitted by using the selected channel code and scrambling code, and then the data to be transmitted is transmitted to the multiplexing unit. The multiplexing (TDM) unit multiplexes the data after spread spectrum processing and the corresponding intermediate code (Midamble) to constitute a burst. The controlling the MIMO antenna array or the smart antenna array to transmit the data to the mobile terminal according to the transmitting mode in the operation 2 may be implemented by a corresponding control unit.

In employing the structure of the smart antenna array used in the existing TD-SCDMA system, due to the influence of factors such as size, scale and distance of antenna elements and antenna element spacing, the spacing between the antenna elements sometimes may not meet the requirement of dependence of MIMO application. Therefore, an embodiment of the present invention also proposes an antenna multiplexing method of dual-polarized antennas, in which two antenna elements constituting the MIMO antenna array are configured to be polarized in different manner. For example, one antenna element is polarized by −45°, and the other antenna element is polarized by +45°. By using the feature of the mutually independent spatial fading characteristics of the mutually orthogonal antenna elements, the dual-polarized MIMO antenna array are constituted, and the requirement of dependence of MIMO application is satisfied, which expands application field and use environment of the embodiments of the present invention. All antenna elements of the smart antenna array employ the same vertical polarization. In the antenna multiplexing method of the smart antenna and the Multiple-Input Multiple-Output antenna in the embodiment of the present invention, the MIMO antenna array and the smart antenna array may employ the structures illustrated in the aforementioned first to seventh embodiments, which will not be described in detail here.

Those skilled in the art should understand that, the implementation of part or all of operations of the above described method embodiments may be achieved by a hardware related to a instruction of a program. The program may be stored in a computer readable storage medium. While executing the program, the operations including the above described method embodiments are executed. The storage medium includes the medium that can store programs, such as a ROM, RAM, magnetic disk or optical disk.

Please note that, the above embodiments are merely used to describe the technical solutions in the embodiments of the present invention, but not limitative. Though the embodiments of the present invention are described in detail with reference to preferable embodiments, those skilled in the art should understand, the technical solutions in the embodiments of the present invention may be modified or equivalently replaced, without departing from the spirit and scope of the technical solutions in the embodiments of the present invention.

The invention claimed is:

1. An antenna multiplexing system of a smart antenna and a Multiple-Input Multiple-Output antenna, comprising an MIMO antenna array and a smart antenna array, the smart antenna array comprises a number of antenna elements, spacing of adjacent antenna elements being smaller than or equal to ½ wavelength, and the MIMO antenna array consists of at least two antenna elements with dependence satisfying requirements of MIMO application;
the antenna multiplexing system further comprising a transmitting processing device configured for controlling the MIMO antenna array and the smart antenna array to transmit a data to a mobile terminal; and
the transmitting processing device comprises:
a determining module configured for determining a transmitting mode according to a type of a data to be transmitted, correspondingly processing the data to be transmitted under the transmitting mode and controlling transmission of the data;
an MIMO antenna array transmitting processing module configured for transmitting a control information data or an MBMS (Multimedia Broadcasting and Multicasting Service) service data to all mobile terminals in a cell through the MIMO antenna array according to the transmitting mode; and
a smart antenna array transmitting processing module configured for transmitting a general service data to a single target mobile terminal in the cell through the smart antenna array according to the transmitting mode,
wherein the determining module further comprises:
a transmitting mode determining unit configured for determining the transmitting mode according to the type of the data to be transmitted:
a data channel code, scrambling code and intermediate code assigning unit configured for selecting and assigning a corresponding channel code, scrambling code and intermediate code to the data to be transmitted of different types according to the transmitting mode;
a data spread spectrum processing unit configured for performing spread spectrum processing on the data to be transmitted according to the channel code and scrambling code;
a multiplexing unit configured for multiplexing the data to be transmitted after spread spectrum processing and the corresponding intermediate code to constitute a burst;
an ON/OFF controller provided on a transmitting path of the multiplexing unit; and
a transmitting mode control unit configured for transmitting the burst through one of the MIMO antenna array transmitting processing module and the smart antenna array transmitting processing module by controlling the ON/OFF controller according to the transmitting mode determined by the transmitting mode determining unit.

2. The antenna multiplexing system of the smart antenna and the Multiple-Input Multiple-Output antenna of claim 1, wherein, the transmitting mode respectively is to transmit a data to all mobile terminals in the cell by the MIMO antenna array and to transmit a data to a single target mobile terminal in the cell by the smart antenna array.

3. The antenna multiplexing system of the smart antenna and the Multiple-Input Multiple-Output antenna of claim 1, wherein, the MIMO antenna array and the smart antenna array constitute an antenna array with N antenna elements, wherein N is an integer, M antenna elements in the antenna array with dependence satisfying the requirement of MIMO application constituting the MIMO antenna array, wherein M is an integer no smaller than 2, and the remaining N-M antenna elements with spacing smaller than or equal to ½ wavelength constituting the smart antenna array.

4. The antenna multiplexing system of the smart antenna and the Multiple-Input Multiple-Output antenna of claim 3, wherein, the MIMO antenna array and the smart antenna array both are vertically polarized antenna array.

5. The antenna multiplexing system of the smart antenna and the Multiple-Input Multiple-Output antenna of claim 3, wherein, the MIMO antenna array is a dual-polarized antenna array, and the smart antenna array is a vertically polarized antenna array.

6. The antenna multiplexing system of the smart antenna and the Multiple-Input Multiple-Output antenna of claim 3, wherein, the antenna array with N antenna elements is a linear antenna array, and the N-M antenna elements constitute a directional smart antenna array.

7. The antenna multiplexing system of the smart antenna and the Multiple-Input Multiple-Output antenna of claim 6, wherein, the M antenna elements constituting the MIMO antenna array are located at an end portion of the linear antenna array.

8. The antenna multiplexing system of the smart antenna and the Multiple-Input Multiple-Output antenna of claim 3, wherein, the antenna array with N antenna elements is a combined antenna array, and the N-M antenna elements constitute a directional smart antenna array in a linear layout or an omnidirectional smart antenna array in a circular layout.

9. The antenna multiplexing system of the smart antenna and the Multiple-Input Multiple-Output antenna of claim 1, wherein, the MIMO antenna array and the smart antenna array constitute an antenna array with N antenna elements, wherein N is an integer, M antenna elements in the antenna array with dependence satisfying the requirement of MIMO application constituting the MIMO antenna array, wherein M is an integer no smaller than 2, and all the N antenna elements with spacing of adjacent antenna elements smaller than or equal to ½ wavelength constituting the smart antenna array.

10. The antenna multiplexing system of the smart antenna and the Multiple-Input Multiple-Output antenna of claim 9, wherein, the MIMO antenna array and the smart antenna array both are vertically polarized antenna arrays.

11. The antenna multiplexing system of the smart antenna and the Multiple-Input Multiple-Output antenna of claim 9, wherein, the MIMO antenna array is a dual-polarized antenna array, and the smart antenna array is a vertically polarized antenna array.

12. The antenna multiplexing system of the smart antenna and the Multiple-Input Multiple-Output antenna of claim 9, wherein, the antenna array with N antenna elements is a linear antenna array, and all the N antenna elements constitute a directional smart antenna array.

13. The antenna multiplexing system of the smart antenna and the Multiple-Input Multiple-Output antenna of claim 12, wherein, the M antenna elements constituting the MIMO antenna array are located at an end portion of the linear antenna array.

14. The antenna multiplexing system of the smart antenna and the Multiple-Input Multiple-Output antenna of claim 9, wherein, the antenna array with N antenna elements is a circular antenna array, and all the N antenna elements constitute an omnidirectional smart antenna array.

15. An antenna multiplexing method of a smart antenna and a Multiple-Input Multiple-Output antenna, comprising:

determining a transmitting mode according to a type of a data to be transmitted;

selecting and assigning a corresponding channel code, scrambling code and intermediate code to the data to be transmitted of different types according to the transmitting mode;

performing spread spectrum processing on the data to be transmitted according to the determined channel code and scrambling code;

multiplexing the data to be transmitted after spread spectrum processing and the corresponding intermediate code to constitute a burst; and transmitting the burst through an MIMO antenna array module or a smart antenna array by controlling an ON/OFF controller provided on a transmitting path according to the transmitting mode, including transmitting a control information or an MBMS (Multimedia Broadcasting and Multicasting Service) service data to all mobile terminals in a cell through the MIMO antenna array according to the transmitting mode, or transmitting a general service data to a single target mobile terminal in the cell through the smart antenna array according to the transmitting mode, the smart antenna array comprises a number of antenna elements, spacing of adjacent antenna elements being smaller than or equal to ½ wavelength, and the MIMO antenna array consists of at least two antenna elements with dependence satisfying requirement of MIMO application.

16. The antenna multiplexing method of a smart antenna and a Multiple-Input Multiple-Output antenna of claim 15, wherein, the transmitting mode respectively is to transmit a data to all mobile terminals in the cell by the MIMO antenna array and to transmit a data to a single target mobile terminal in the cell by the smart antenna array.

17. The antenna multiplexing method of a smart antenna and a Multiple-Input Multiple-Output antenna of claim 15, wherein, the MIMO antenna array and the smart antenna array both are vertically polarized antenna arrays.

18. The antenna multiplexing method of a smart antenna and a Multiple-Input Multiple-Output antenna of claim 15, wherein, the MIMO antenna array is a dual-polarized antenna array, and the smart antenna array is a vertically polarized antenna array.

* * * * *